United States Patent
Zhong et al.

(10) Patent No.: US 9,638,968 B2
(45) Date of Patent: May 2, 2017

(54) COLOR LIQUID CRYSTAL DISPLAY PANEL AND MANUFACTURING METHOD THEREOF

(71) Applicant: Shenzhen China Star Optoelectronics Technology Co., Ltd., Shenzhen, Guangdong (CN)

(72) Inventors: Xinhui Zhong, Guangdong (CN); Kuancheng Lee, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 569 days.

(21) Appl. No.: 14/241,054

(22) PCT Filed: Dec. 2, 2013

(86) PCT No.: PCT/CN2013/088352
§ 371 (c)(1),
(2) Date: Feb. 25, 2014

(87) PCT Pub. No.: WO2015/078023
PCT Pub. Date: Jun. 4, 2015

(65) Prior Publication Data
US 2016/0252768 A1    Sep. 1, 2016

(30) Foreign Application Priority Data
Nov. 28, 2013    (CN) .......................... 2013 1 0625529

(51) Int. Cl.
*G02F 1/1335* (2006.01)
*G02F 1/1347* (2006.01)
(Continued)

(52) U.S. Cl.
CPC ........ *G02F 1/13473* (2013.01); *G02F 1/1337* (2013.01); *G02F 1/1339* (2013.01);
(Continued)

(58) Field of Classification Search
CPC ............................................. G02F 2001/133521
See application file for complete search history.

(56) References Cited

U.S. PATENT DOCUMENTS

2003/0133069 A1    7/2003 Jeong et al.
2003/0206260 A1*   11/2003 Kobayashi .......... G02F 1/13473
                                                        349/115
(Continued)

FOREIGN PATENT DOCUMENTS

CN         1363849 A       8/2002
CN       102692752 A       9/2012
(Continued)

*Primary Examiner* — Phu Vu
(74) *Attorney, Agent, or Firm* — Andrew C. Cheng (57) ABSTRACT

The present invention provides a color liquid crystal display panel and a manufacturing method thereof, in which red, green, and blue sub-pixels are formed by means of a black matrix barrier and dye-doped liquid crystal layers that contain dichroic dyes so that the manufacturing process is reduced, the structure is simple, and the cost is low. In addition, there is no need to manufacture a conventional color filter substrate and there is no need to include a conventionally used polarizer thereby simplifying the manufacturing process of a liquid crystal display panel, lowering down the manufacturing cost of the liquid crystal display panel, reducing the required backlighting brightness, and enhancing light transmittal and optic efficiency.

14 Claims, 7 Drawing Sheets

(51) Int. Cl.

| | | |
|---|---|---|
| *G02F 1/1339* | (2006.01) | |
| *G02F 1/137* | (2006.01) | |
| *G02F 1/1337* | (2006.01) | |
| *G02F 1/1341* | (2006.01) | |
| *G02F 1/1343* | (2006.01) | |
| *G02F 1/1362* | (2006.01) | |
| *G02F 1/1368* | (2006.01) | |
| *G02F 1/1333* | (2006.01) | |

(52) U.S. Cl.
CPC .......... *G02F 1/1341* (2013.01); *G02F 1/1368* (2013.01); *G02F 1/13394* (2013.01); *G02F 1/13475* (2013.01); *G02F 1/13737* (2013.01); *G02F 1/133512* (2013.01); *G02F 1/134309* (2013.01); *G02F 1/136286* (2013.01); *G02F 2001/13398* (2013.01); *G02F 2001/133302* (2013.01); *G02F 2001/133357* (2013.01); *G02F 2001/133521* (2013.01); *G02F 2001/133738* (2013.01); *G02F 2001/134345* (2013.01); *G02F 2001/136295* (2013.01); *G02F 2201/50* (2013.01)

(56) References Cited

U.S. PATENT DOCUMENTS

| | | | |
|---|---|---|---|
| 2008/0094551 A1 | 4/2008 | Hayashi et al. | |
| 2013/0329152 A1* | 12/2013 | Zhong | G02F 1/133377 349/43 |
| 2015/0146145 A1* | 5/2015 | Zhong | G02F 1/133514 349/106 |
| 2015/0192828 A1* | 7/2015 | Zhong | C09K 19/586 349/46 |
| 2016/0195754 A1* | 7/2016 | Zhong | G02F 1/13475 349/43 |

FOREIGN PATENT DOCUMENTS

| | | |
|---|---|---|
| CN | 202916552 U | 5/2013 |
| JP | 2010230759 A | 10/2010 |

\* cited by examiner

COLOR LIQUID CRYSTAL DISPLAY PANEL AND MANUFACTURING METHOD THEREOF

BACKGROUND OF THE INVENTION

1. Field of the Invention

The present invention relates to the field of liquid crystal display technology, and in particular to a color liquid crystal display panel and a manufacturing method thereof.

2. The Related Arts

Liquid crystal displays (LCDs) have a variety of advantages, such as thin device body, low power consumption, and being free of radiation, and are thus widely used. Most of the liquid crystal displays that are currently available in the market are backlighting liquid crystal displays, which comprise a liquid crystal display panel and a backlight module. The operation principle of the liquid crystal display panel is that, with liquid crystal molecules interposed between two parallel glass substrates, application of electricity is selectively carried out to control the liquid crystal molecules to change direction in order to refract out light emitting from the backlight module for generating images.

The liquid crystal display panel comprises a color filter (CF) substrate, a thin-film transistor (TFT) substrate, liquid crystal (LC) interposed between the CF substrate and the TFT substrate, and a sealant and the manufacturing process generally comprises: a front stage of array process (including thin film, yellow light, etching, and film stripping), an intermediate stage of cell process (including laminating the TFT substrate and the CF substrate), and a rear stage of assembling process (including mounting of drive ICs and printed circuit board). The front stage of array process generally forms the TFT substrate in order to control the movement of the liquid crystal molecules. The intermediate stage of cell process generally introduces the liquid crystal between the TFT substrate and the CF substrate. The rear stage of assembling process generally integrates the drive ICs and combining the printed circuit board to achieve driving of the liquid crystal molecules to rotate for displaying images.

Figure 1:
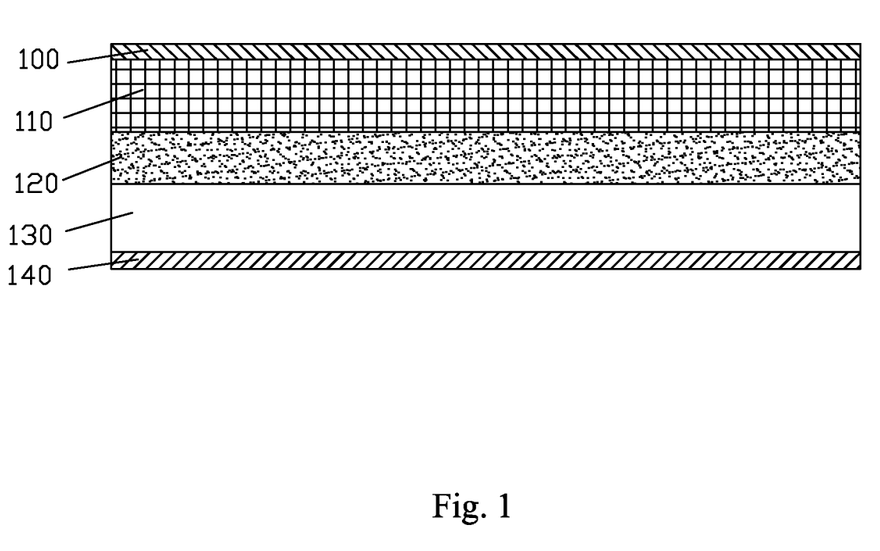
FIG. 1 is a schematic view showing the structure of a conventional color liquid crystal display panel.

Referring to FIG. 1, which is a schematic view showing the structure of a conventional liquid crystal display panel, the conventional liquid crystal display panel generally comprises, in a layer stacked arrangement from top to bottom, an upper polarizer 100, a color filter substrate 110, a dye-doped liquid crystal layer 120, a thin-film transistor substrate 130, and a lower polarizer 140, the layers being stacked, sequentially from top to bottom, to constitute a display panel.

To achieve full color displaying, a common practice is to form a color filter substrate on a glass plate of a liquid crystal display panel (which is often a glass plate that is set opposite to the glass plate of the thin-film transistor substrate but can alternatively be the glass plate of the thin-film transistor substrate) through processes of coating, exposure, and development, so as to make use of the principle of spatial color mixture to fulfill full color displaying.

However, the CF substrate allows only lights of a portion of wavebands to pass therethrough and a polarizer must be included for polarization of the light. Consequently, the light intensity behind the CF substrate is reduced to only around 33% of the original level. This is one of the causes that make the optical efficiency of the conventional LCD relatively low. Further, since it is necessary to include a polarizer and the manufacture of a color filter substrate requires various processes including coating, exposure, and development, making the manufacturing process complicated and the cost high, it is adverse to the control of the manufacture cost.

SUMMARY OF THE INVENTION

An object of the present invention is to provide a color liquid crystal display panel, which has a simple structure, requiring no inclusion of a polarizer and making of a color filter substrate, so that the manufacturing process is simple, the manufacture cost of the liquid crystal display panel is lowered down, the requirement of backlighting brightness is reduced, and light transmittal and optical efficiency are enhanced.

Another object of the present invention is to provide a manufacturing method of a color liquid crystal display panel, which simplifies the manufacturing process of a liquid crystal display panel and lowers down the manufacturing cost of the liquid crystal display panel and the liquid crystal display panel manufactured therewith has a reduced requirement for backlighting brightness thereby enhancing transmittal and optical efficiency.

To achieve the above objects, the present invention provides a color liquid crystal display panel, which comprises: a first substrate, a second substrate laminated to the first substrate, a plurality of sub-pixel areas formed on the first substrate, dye-doped liquid crystal layers arranged in the sub-pixel areas, and a sealant frame arranged along a circumferential edge of the first substrate to hermetically bond the first and second substrates together. The dye-doped liquid crystal layers each comprise a liquid crystal material, a dichroic dye, and a chiral dopant. The dye-doped liquid crystal layers each absorb a light of a specific wavelength range according to type of the dichroic dye contained therein whereby the sub-pixel areas respectively absorb lights of different wavelength ranges. The first substrate comprises a black matrix barrier formed thereon and the black matrix barrier comprises a plurality of blocking walls. Each of the sub-pixel areas is surrounded by four sequentially connected ones of the blocking walls. The second substrate has a surface facing the first substrate and set in tight engagement with the black matrix barrier so as to hermetically seal the dye-doped liquid crystal layers of the sub-pixel areas in the sub-pixel areas respectively.

The plurality of blocking walls respectively has a first and a second heights, the first height being greater than the second height, whereby two adjacent ones of the sub-pixel areas that have dye-doped liquid crystal layers comprising different types of dichroic dye have therebetween a blocking wall of the first height, while two adjacent ones of the sub-pixel areas that have dye-doped liquid crystal layers comprising the same type of dichroic dye have therebetween a blocking wall of the second height.

The first substrate is a package substrate and the package substrate comprises a first transparent substrate, common electrodes formed on the first transparent substrate, a first planarization layer formed on the common electrodes, and a first alignment layer formed on the first planarization layer, the black matrix barrier being formed on the first alignment layer; and the second substrate is a thin-film transistor substrate and he thin-film transistor substrate comprising a second transparent substrate, a plurality of gate lines formed on the second transparent substrate, a plurality of data lines formed on the second transparent substrate, an array of thin-film transistors formed on the second transparent substrate, a protection layer formed on the array of thin-film transistors, a plurality of pixel electrodes formed on the protection layer, a second planarization layer formed on the pixel electrodes and the protection layer, and a second alignment layer formed on the second planarization layer.

The first transparent substrate and the second transparent substrate are both glass substrates. The common electrodes and the pixel electrodes are made of indium tin oxides. The first alignment layer and the second alignment layer are both horizontal alignment layers. An alignment direction of the first alignment layer defines an included angle with respect to an alignment direction of the second alignment layer and the included angle is greater than 0° and less than 180°.

The liquid crystal materials are a positive nematic liquid crystal material and the dichroic dyes are dissolved in the liquid crystal materials, the liquid crystal materials comprising liquid crystal molecules, the dichroic dyes comprising dichroic dye molecules, the dichroic dye molecules having selective absorptivity of visible light; when a visible light travels in a direction parallel to a major axis of the dichroic dye molecules, the dichroic dye molecules show no absorbability of the visible light and when a visible light travels in a direction perpendicular to the major axis of the dichroic dye molecules, the dichroic dye molecules show absorbability of visible light; the dichroic dyes include: red dichroic dyes, green dichroic dyes, and blue dichroic dyes, the liquid crystal materials in which different dichroic dyes are dissolved being injected into the sub-pixel areas respectively to form red sub-pixels, green sub-pixels, and blue sub-pixels, whereby the red sub-pixels absorb lights of green and blue wavelength ranges so as to allow red light to transmit therethrough; the green sub-pixels absorb lights of red and blue wavelength ranges so as to allow green light to transmit therethrough; and the blue sub-pixels absorb lights of red and green wavelength ranges so as to allow blue light to transmit therethrough.

The present invention also provides a color liquid crystal display panel, which comprises: a first substrate, a second substrate laminated to the first substrate, a plurality of sub-pixel areas formed on the first substrate, dye-doped liquid crystal layers arranged in the sub-pixel areas, and a sealant frame arranged along a circumferential edge of the first substrate to hermetically bond the first and second substrates together, the dye-doped liquid crystal layers each comprising a liquid crystal material, a dichroic dye, and a chiral dopant, the dye-doped liquid crystal layers each absorbing a light of a specific wavelength range according to type of the dichroic dye contained therein whereby the sub-pixel areas respectively absorb lights of different wavelength ranges, the first substrate comprising a black matrix barrier formed thereon, the black matrix barrier comprising a plurality of blocking walls, each of the sub-pixel areas being surrounded by four sequentially connected ones of the blocking walls, the second substrate having a surface facing the first substrate and set in tight engagement with the black matrix barrier so as to hermetically seal the dye-doped liquid crystal layers of the sub-pixel areas in the sub-pixel areas respectively;

wherein the plurality of blocking walls respectively has a first and a second heights, the first height being greater than the second height, whereby two adjacent ones of the sub-pixel areas that have dye-doped liquid crystal layers comprising different types of dichroic dye have therebetween a blocking wall of the first height, while two adjacent ones of the sub-pixel areas that have dye-doped liquid crystal layers comprising the same type of dichroic dye have therebetween a blocking wall of the second height.

The first substrate is a package substrate and the package substrate comprises a first transparent substrate, common electrodes formed on the first transparent substrate, a first planarization layer formed on the common electrodes, and a first alignment layer formed on the first planarization layer, the black matrix barrier being formed on the first alignment layer; and the second substrate is a thin-film transistor substrate and the thin-film transistor substrate comprising a second transparent substrate, a plurality of gate lines formed on the second transparent substrate, a plurality of data lines formed on the second transparent substrate, an array of thin-film transistors formed on the second transparent substrate, a protection layer formed on the array of thin-film transistors, a plurality of pixel electrodes formed on the protection layer, a second planarization layer formed on the pixel electrodes and the protection layer, and a second alignment layer formed on the second planarization layer.

The first transparent substrate and the second transparent substrate are both glass substrates. The common electrodes and the pixel electrodes are made of indium tin oxides. The first alignment layer and the second alignment layer are both horizontal alignment layers. An alignment direction of the first alignment layer defines an included angle with respect to an alignment direction of the second alignment layer and the included angle is greater than 0° and less than 180°.

The liquid crystal materials are a positive nematic liquid crystal material and the dichroic dyes are dissolved in the liquid crystal materials, the liquid crystal materials comprising liquid crystal molecules, the dichroic dyes comprising dichroic dye molecules, the dichroic dye molecules having selective absorptivity of visible light; when a visible light travels in a direction parallel to a major axis of the dichroic dye molecules, the dichroic dye molecules show no absorbability of the visible light and when a visible light travels in a direction perpendicular to the major axis of the dichroic dye molecules, the dichroic dye molecules show absorbability of visible light; the dichroic dyes include: red dichroic dyes, green dichroic dyes, and blue dichroic dyes, the liquid crystal materials in which different dichroic dyes are dissolved being injected into the sub-pixel areas respectively to form red sub-pixels, green sub-pixels, and blue sub-pixels, whereby the red sub-pixels absorb lights of green and blue wavelength ranges so as to allow red light to transmit therethrough; the green sub-pixels absorb lights of red and blue wavelength ranges so as to allow green light to transmit therethrough; and the blue sub-pixels absorb lights of red and green wavelength ranges so as to allow blue light to transmit therethrough.

The present invention further provides a manufacturing method of a color liquid crystal display panel, which comprises the following steps:

(1) providing a first substrate;

(2) forming a plurality of blocking walls on the first substrate so as to form a black matrix barrier to divide the first substrate into a plurality of predetermined sub-pixel areas, each of the sub-pixel areas being surrounded by four sequentially connected ones of the blocking walls;

(3) applying an injection process to sequentially introduce liquid crystal materials containing a chiral dopant and dichroic dyes into the sub-pixel areas so as to form dye-doped liquid crystal layers, the sub-pixel areas respectively absorbing lights of specific wavelength ranges according to types of the dichroic dye introduced;

(4) coating a sealant on a surface of the first substrate to form a sealant frame;

(5) providing a second substrate;

(6) laminating the second substrate and the first substrate together in a vacuum environment in such a way that a surface of the second substrate that faces the first substrate is set in tight engagement with the black matrix barrier so as to seal the dye-doped liquid crystal layers of the sub-pixel areas hermetically in the sub-pixel areas respectively; and (7) curing the sealant frame to complete the lamination of the color liquid crystal display panel.

The plurality of blocking walls respectively has a first and a second heights, the first height being greater than the second height, whereby two adjacent ones of the sub-pixel areas that have dye-doped liquid crystal layers comprising different types of dichroic dye have therebetween a blocking wall of the first height, while two adjacent ones of the sub-pixel areas that have dye-doped liquid crystal layers comprising the same type of dichroic dye have therebetween a blocking wall of the second height;

in step (7), the laminated second substrate and first substrate being subjected to UV curing or thermal curing to solidify the sealant frame.

The first substrate is a package substrate and the package substrate comprises a first transparent substrate, common electrodes formed on the first transparent substrate, a first planarization layer formed on the common electrodes, and a first alignment layer formed on the first planarization layer, the black matrix barrier being formed on the first alignment layer; and the second substrate is a thin-film transistor substrate and he thin-film transistor substrate comprising a second transparent substrate, a plurality of gate lines formed on the second transparent substrate, a plurality of data lines formed on the second transparent substrate, an array of thin-film transistors formed on the second transparent substrate, a protection layer formed on the array of thin-film transistors, a plurality of pixel electrodes formed on the protection layer, a second planarization layer formed on the pixel electrodes and the protection layer, and a second alignment layer formed on the second planarization layer.

The first transparent substrate and the second transparent substrate are both glass substrates. The common electrodes and the pixel electrodes are made of indium tin oxides. The first alignment layer and the second alignment layer are both horizontal alignment layers. An alignment direction of the first alignment layer defines an included angle with respect to an alignment direction of the second alignment layer and the included angle is greater than 0° and less than 180°.

The liquid crystal materials are a positive nematic liquid crystal material and the dichroic dyes are dissolved in the liquid crystal materials, the liquid crystal materials comprising liquid crystal molecules, the dichroic dyes comprising dichroic dye molecules, the dichroic dye molecules having selective absorptivity of visible light; when a visible light travels in a direction parallel to a major axis of the dichroic dye molecules, the dichroic dye molecules show no absorbability of the visible light and when a visible light travels in a direction perpendicular to the major axis of the dichroic dye molecules, the dichroic dye molecules show absorbability of visible light; the dichroic dyes include: red dichroic dyes, green dichroic dyes, and blue dichroic dyes, the liquid crystal materials in which different dichroic dyes are dissolved being injected into the sub-pixel areas respectively to form red sub-pixels, green sub-pixels, and blue sub-pixels, whereby the red sub-pixels absorb lights of green and blue wavelength ranges so as to allow red light to transmit therethrough; the green sub-pixels absorb lights of red and blue wavelength ranges so as to allow green light to transmit therethrough; and the blue sub-pixels absorb lights of red and green wavelength ranges so as to allow blue light to transmit therethrough.

The efficacy of the present invention is that the present invention provides a color liquid crystal display panel and a manufacturing method thereof, wherein red, green, and blue sub-pixels are formed by means of a black matrix barrier and dye-doped liquid crystal layers that contain dichroic dyes so that the manufacturing process is reduced, the structure is simple, and the cost is low. In addition, there is no need to manufacture a conventional color filter substrate and there is no need to include a conventionally used polarizer thereby simplifying the manufacturing process of a liquid crystal display panel, lowering down the manufacturing cost of the liquid crystal display panel, reducing the required backlighting brightness, and enhancing light transmittal and optic efficiency.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

Referring to FIGS. 2-8, the present invention provides a color liquid crystal display panel, which comprises: a first substrate 2, a second substrate 3 laminated to the first substrate 2, a plurality of sub-pixel areas 4 formed on the first substrate 2, dye-doped liquid crystal layers 5 arranged in the sub-pixel areas 4, and a sealant frame 6 arranged along a circumferential edge of the first substrate 2 to hermetically bond the first and second substrates 2, 3 together.

Figure 2:
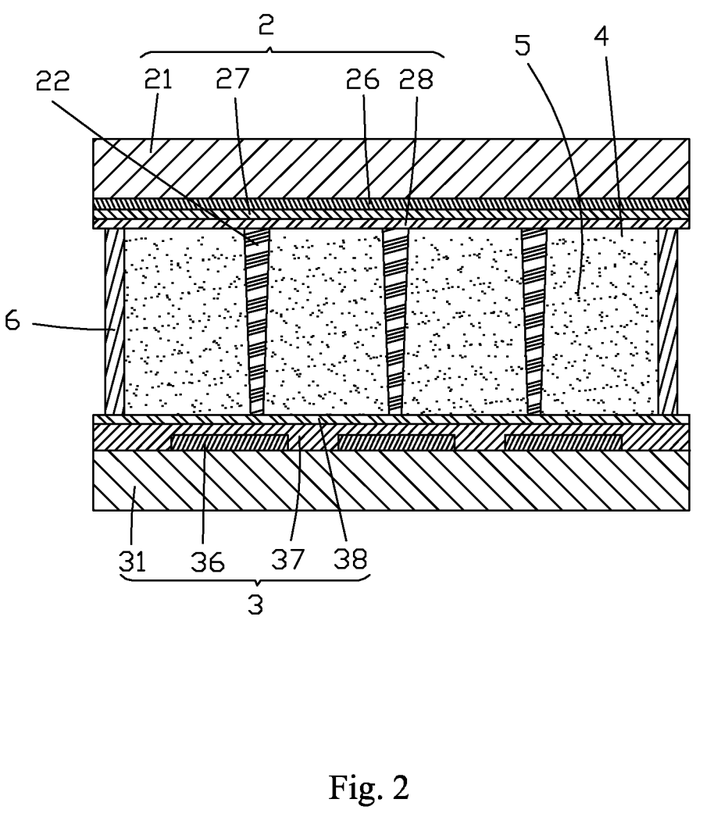
FIG. 2 is a schematic view showing the structure of a color liquid crystal display panel according to the present invention.
Figure 3:
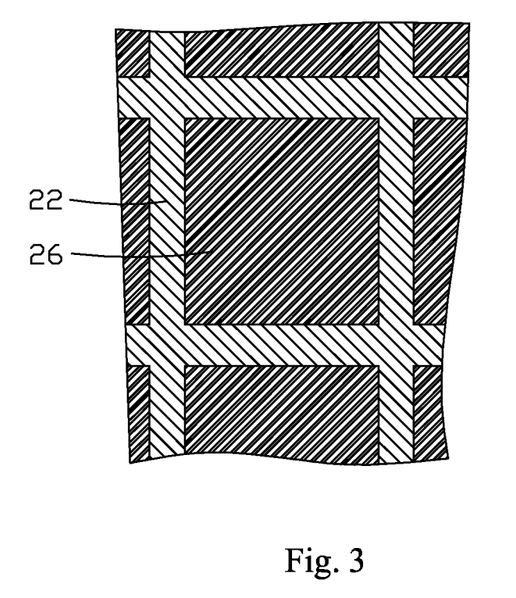
FIG. 3 is a top plan view of a first substrate and a black matrix barrier of FIG. 2.

As shown in FIGS. 2 and 3, the first substrate 2 is a package substrate. The package substrate comprises a first transparent substrate 21, common electrodes 26 formed on the first transparent substrate 21, a first planarization layer 27 formed on the common electrodes 26, and a first alignment layer 28 formed on the first planarization layer 27.

The first transparent substrate 21 can be a glass substrate or aplastic substrate and is preferably a glass substrate in the instant embodiment. The common electrodes 26 are preferably made of indium tin oxides (ITO). The first alignment layer 28 is a horizontal alignment layer. The common electrodes 26, the first planarization layer 27, and the first alignment layer 28 are all manufactured by masking processes.

Figure 4:
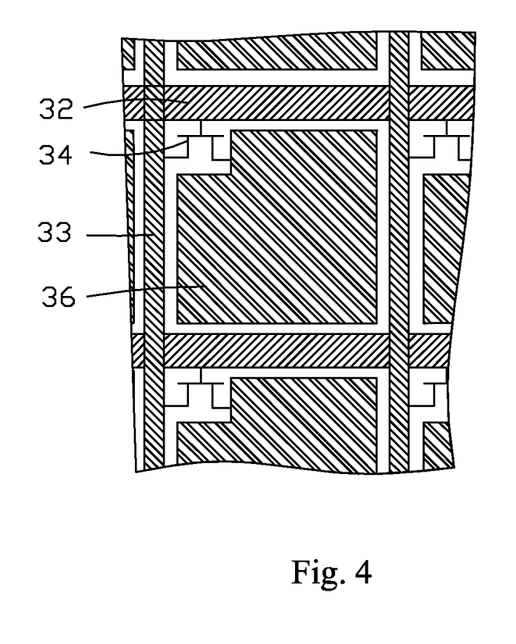
FIG. 4 shows a diagram of an equivalent circuit of a second substrate of FIG. 2.

As shown in FIGS. 2 and 4, wherein for easy observation, structures related to a thin-film transistor array, data lines, gate lines, and a protection layer are omitted in FIG. 2, the second substrate 3 is a thin-film transistor substrate. The thin-film transistor substrate comprises a second transparent substrate 31, a plurality of gate lines 32 formed on the second transparent substrate 31, a plurality of data lines 33 formed on the second transparent substrate 31, an array of thin-film transistors 34 formed on the second transparent substrate 31, a protection layer formed on the array of thin-film transistors 34, a plurality of pixel electrodes 36 formed on the protection layer, a second planarization layer 37 formed on the pixel electrodes 36 and the protection layer, and a second alignment layer 38 formed on the second planarization layer 37.

The second transparent substrate 31 can be a glass substrate or aplastic substrate and is preferably a glass substrate in the instant embodiment.

The thin-film transistors 34 each have a gate terminal, a source terminal, and a drain terminal. The gate terminal is electrically connected to the gate lines 32. The source terminal is electrically connected to the data lines 33. The drain terminal is electrically connected to the pixel electrodes 36. The pixel electrodes 36 are preferably made of indium tin oxides. The second alignment layer 38 is a horizontal alignment layer. The pixel electrodes 36, the second planarization layer 37, and the second alignment layer 38 are all manufactured by masking processes.

Figure 7:
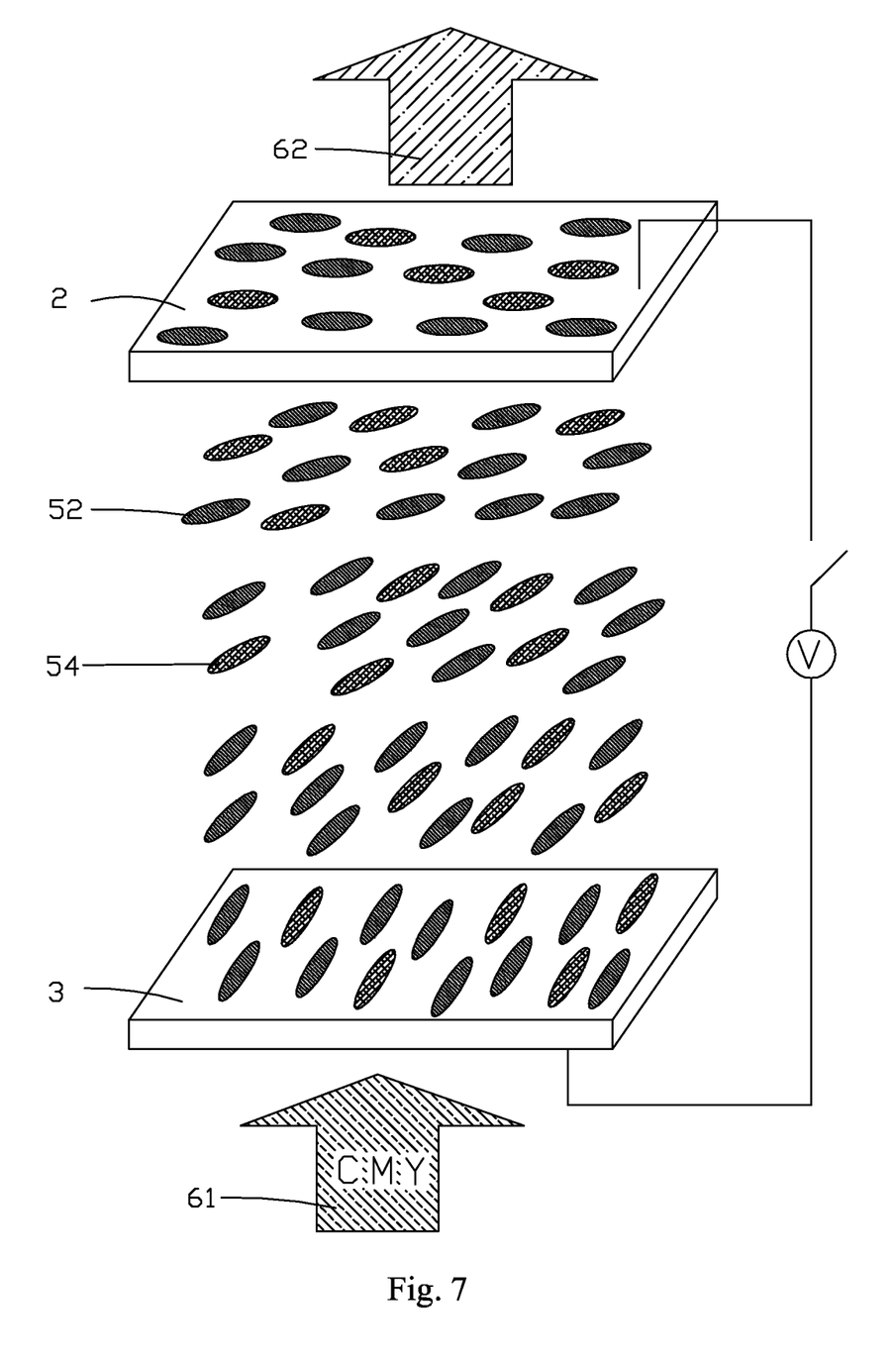
FIGS. 7 and 8 are schematic views demonstrating the principle of color displaying with the color liquid crystal display panel according to the present invention.

The second alignment layer 38 has an alignment direction that defines an included angle with respect to an alignment direction of the first alignment layer 28 and the included angle is greater than 0° and less than 180°. The included angle is preferably 90°. The second alignment layer 38 and the first alignment layer 28 make liquid crystal molecules 52 and dichroic dye molecules 54 contained in the dye-doped liquid crystal layers 5 show a nematic twisted arrangement in an initial condition and the twisted angle is greater than or equal to 90°, meaning when no driving voltage is applied to the first substrate 2 (the thin-film transistor substrate) and the second substrate 3 (the package substrate), the liquid crystal molecules 52 and the dichroic dye molecules 54 both show a twisted arrangement of 90° or more than 90° and have aligning angles in various directions, as shown in FIG. 7.

The first substrate 2 comprises a black matrix barrier 22 formed thereon. The black matrix barrier 22 comprises a plurality of blocking walls 220. The sub-pixel areas 4 are formed on the first alignment layer 28 and each of the sub-pixel areas 4 is surrounded by four sequentially connected ones of the blocking walls 220. After the first substrate 2 and the second substrate 3 are hermetically laminated, a surface of the second substrate 3 that faces the first substrate 2 is set in tight engagement with the black matrix barrier 22 so as to hermetically seal the dye-doped liquid crystal layers 5 of the sub-pixel areas 4 in the sub-pixel areas 4 respectively.

The dye-doped liquid crystal layers 5 arranged in the sub-pixel areas 4 each comprise a liquid crystal material, a dichroic dye, and a chiral dopant. The liquid crystal material is a positive nematic liquid crystal material and the dichroic dye is dissolved in the liquid crystal material.

The dye-doped liquid crystal layers 5 each absorb a light of a specific wavelength range according to the type of the dichroic dye included therein, whereby the sub-pixel areas 4 respectively absorb lights of different wavelength ranges. In the instant embodiment, the dichroic dyes used include: red dichroic dyes, green dichroic dyes, and blue dichroic dyes. The liquid crystal materials with the dichroic dyes dissolved therein are introduced through injection into the sub-pixel areas 4 to respectively form red sub-pixels, green sub-pixels, and blue sub-pixels. The red sub-pixels absorb lights of green and blue wavelength ranges so as to allow red light to transmit therethrough; the green sub-pixels absorb lights of red and blue wavelength ranges so as to allow green light to transmit therethrough; and the blue sub-pixels absorb lights of red and green wavelength ranges so as to allow blue light to transmit therethrough.

Figure 5:
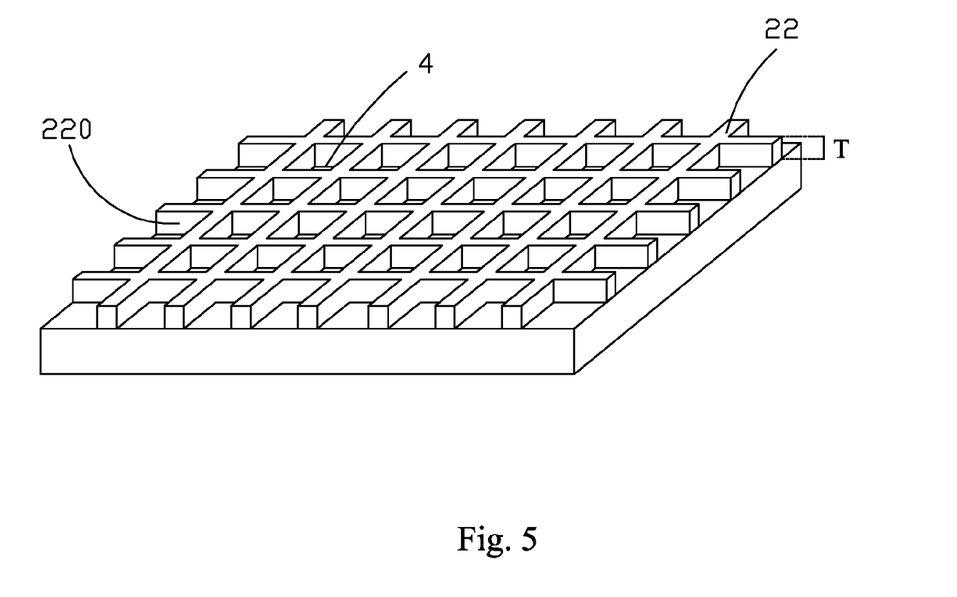
FIG. 5 is a perspective view showing the structure of a black matrix barrier of the liquid crystal display panel according to an embodiment of the present invention.

As shown in FIG. 5, in the instant embodiment, the plurality of blocking walls 220 all has the same height T with respect to the first substrate 2 in order to block the materials of the dye-doped liquid crystal layers 5 contained in the sub-pixel areas 4 from flowing toward each other to cause color disorderliness.

Figure 6:
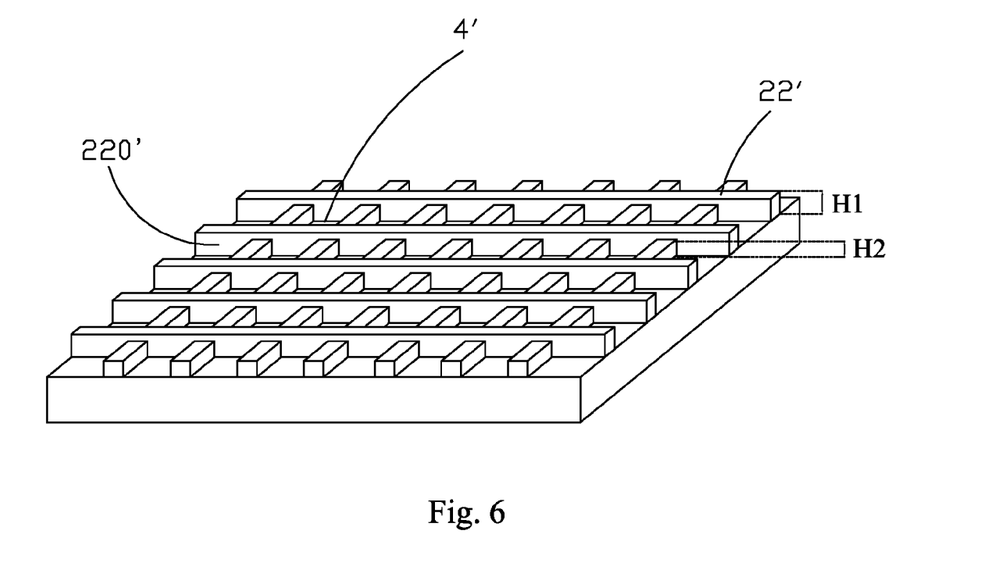
FIG. 6 is a perspective view showing the structure of a black matrix barrier of the liquid crystal display panel according to another embodiment of the present invention.

Referring to FIG. 6, a perspective view showing the structure of a black matrix barrier 22' of a liquid crystal display panel according to another embodiment of the present invention is given. With additional reference made to FIG. 2, in the instant embodiment, the plurality of blocking walls 220' has, respectively, a first and a second heights H1, H2, where the first height H1 is greater than the second height H2. Two adjacent sub-pixel areas 4' that have dye-doped liquid crystal layers 5 comprising different types of dichroic dye have therebetween a blocking wall 220' of the first height H1, while two adjacent sub-pixel areas 4' that have dye-doped liquid crystal layers 5 comprising the same type of dichroic dye have therebetween a blocking wall 220' of the second height H2, whereby the dye-doped liquid crystal layers 5 of the sub-pixel areas 4' of different colors are completely blocked from each other, while the dye-doped liquid crystal layers 5 of the sub-pixel areas 4' of identical color are allowed to have molecules thereof flowing toward each other to improve the effect of displaying.

Figure 8:
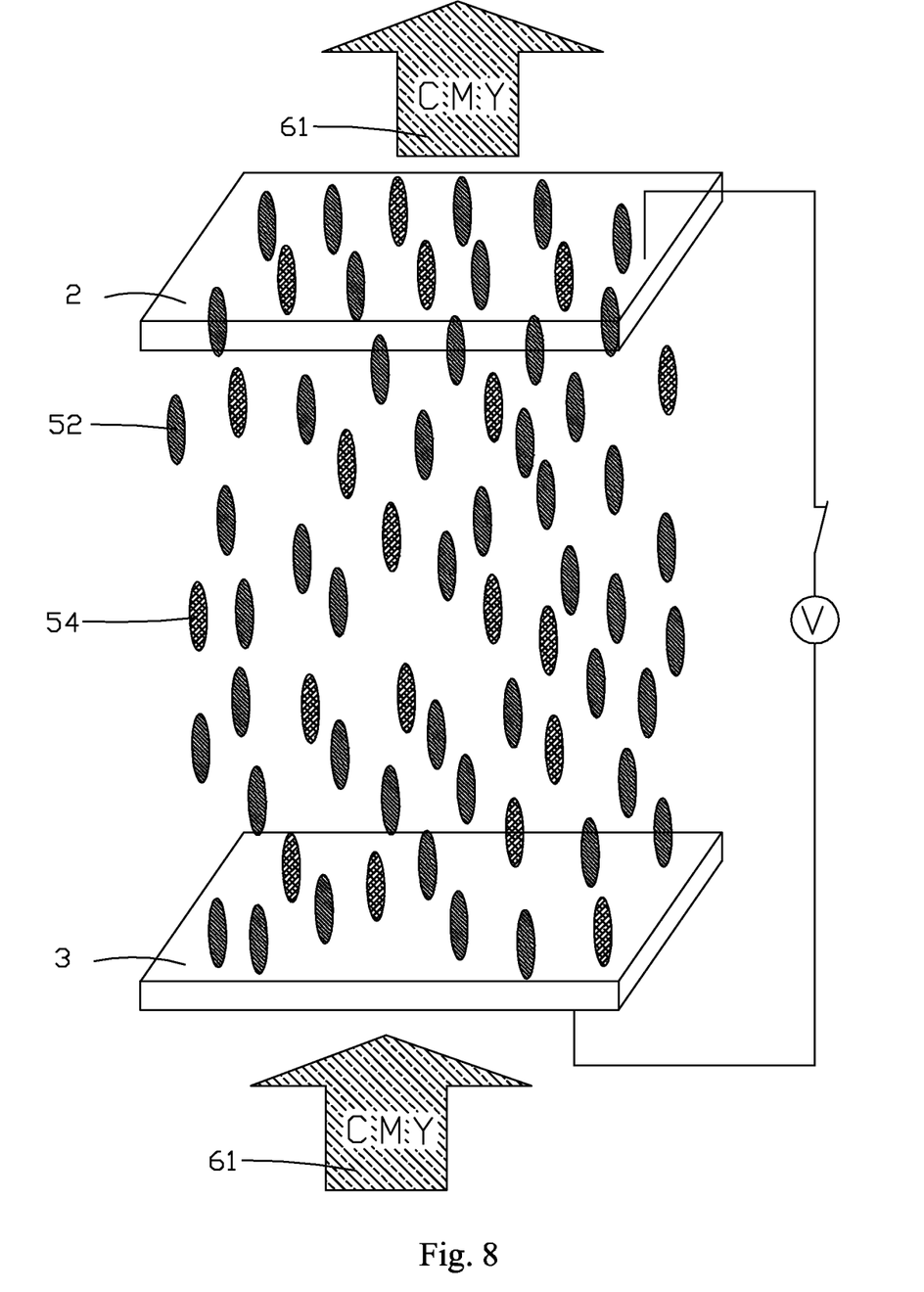

Referring to FIGS. 7-8, a principle of color displaying with the color liquid crystal display panel of the present invention is demonstrated. All the dye-doped liquid crystal layers 4 are formed by dissolving a predetermined amount of dichroic dye in the liquid crystal material and thus, the dye-doped liquid crystal layers 5 each comprise liquid crystal molecules 52 and dichroic dye molecules 54, where the dichroic dye molecules 54 have a molecular structure similar to a molecular structure of the liquid crystal molecules 52 and the dichroic dye molecules 54 show selective absorptivity of visible light. When a visible light travels in a direction parallel to a major axis of the dichroic dye molecules 54, the dichroic dye molecules 54 generally do not absorb the visible light; and when a visible light travels in a direction perpendicular to the major axis of the dichroic dye molecules 54, the dichroic dye molecules 54 strongly absorb the visible light. Thus, through controlling the included angle between the dichroic dye molecules 54 and light emitting from a backlight source (not shown), the extent of absorption of the light emitting from a backlight source by the dichroic dye molecules 54 can be adjusted, thereby achieving an effect of adjusting the intensity of transmitting light and enabling realization of the purpose of displaying various grey levels.

As shown in FIG. 7, when no driving voltage is applied to the first substrate 2 and the second substrate 3, the liquid crystal molecules 52 and the dichroic dye molecules 54 of each of the sub-pixel areas 4 show a nematic twisted arranged having an angle 90° or more than 90° and have aligning angles in various directions. Since both the first alignment layer 28 and the second alignment layer 38 are horizontal alignment layers, the dichroic dye molecules 54 contained in each of the sub-pixel areas 4 show absorbability on a light 61 that gets vertically incident to surfaces of the first substrate 2 and the second substrate 3 and a light that is not absorbed is allowed to transmit through the liquid crystal display panel. Since each dichroic dye has a specific absorption spectrum and the sub-pixel areas 4 that contain different types of dichroic dye exhibit different absorption spectra, a transmitting light 62 can be generated with a specific color. As such, by selecting and injecting different types of dichroic dyes into different sub-pixel areas 4, the purpose of color displaying can be achieved.

Since the dichroic dye molecules 54 contained in different sub-pixel areas 4 are of different types, they absorb lights of different wavelength ranges. In the instant embodiment, the sub-pixel areas 4 respectively form red sub-pixels, green sub-pixels, and blue sub-pixels, where the red sub-pixels absorb lights of green and blue wavelength ranges so as to display a red color; the green sub-pixels absorb lights of red and blue wavelength ranges so as to display a green color; and the blue sub-pixels absorb lights of red and green wavelength ranges so as to display a blue color. As such, a liquid crystal display panel that comprises multiple sub-pixels that display different colors can display multiple colors so as to achieve the purpose of color displaying.

As shown in FIG. 8, when a driving voltage is applied to the first substrate 2 and the second substrate 3, under the action of the electric field, the liquid crystal molecules 52 and the dichroic dye molecules 54 rotate and the rotation angle thereof is adjusted by controlling the level of driving voltage applied. When the driving voltage applied to the first substrate 2 and the second substrate 3 reaches a predetermined level, the liquid crystal molecules 52 and the dichroic dye molecules 54 become aligned in a direction perpendicular to a surface of the first substrate 2 or the second substrate 3. Under this condition, since the liquid crystal molecules 52 generally do not absorb visible light and since the dichroic dye molecules 54 generally also do not absorb the light 61 emitting from the backlight source due to the major axis of dichroic dye molecules 54 being parallel to the traveling direction of the light emitting from the backlight source, when the driving voltage applied to the first substrate 2 and the second substrate 3 reaches the predetermined level, the light 61 emitting from the backlight source can mostly transmit through the liquid crystal display panel, whereby the entire liquid crystal display panel shows a bright state.

Figure 9:
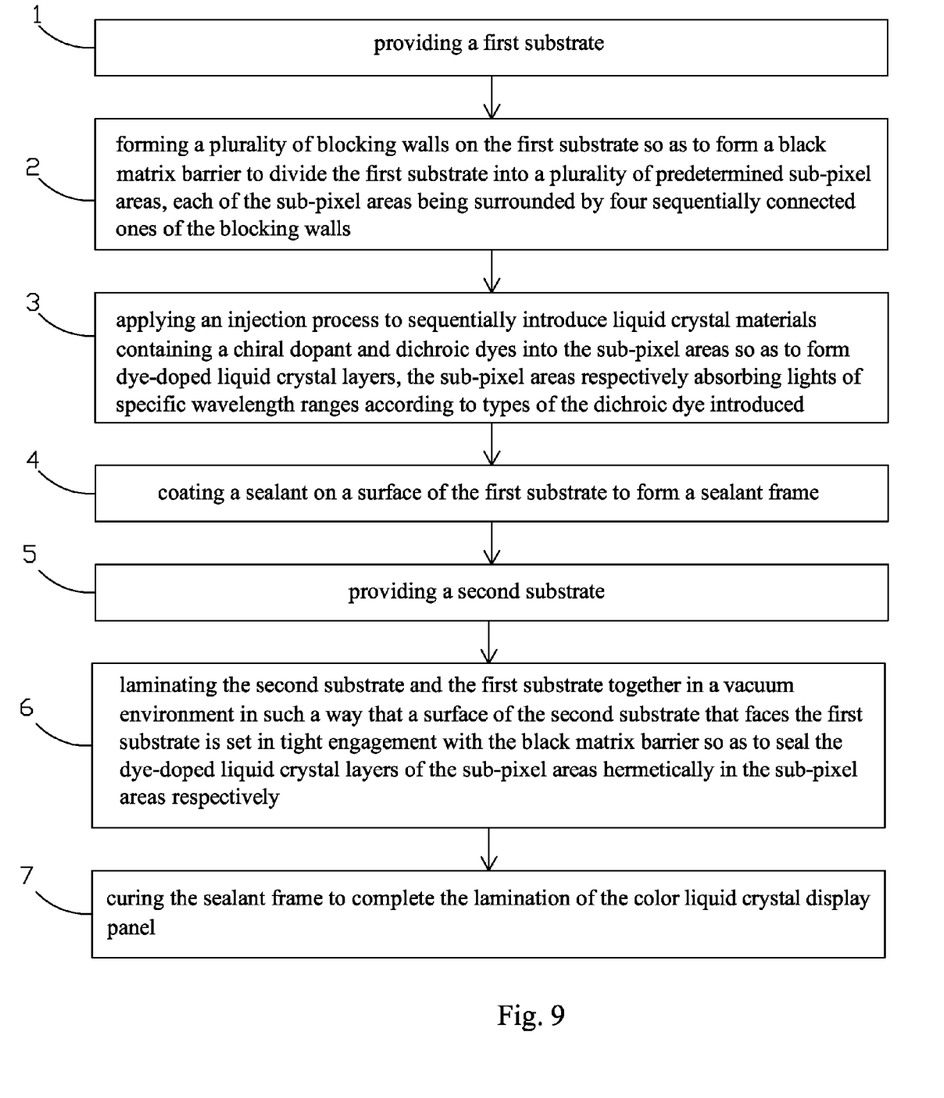
FIG. 9 is a flow chart illustrating a manufacturing method of a liquid crystal display panel according to the present invention.

Referring to FIG. 9, with additional reference being had to FIGS. 2-5, the present invention also provides a manufacturing method of a color liquid crystal display panel, which comprises the following steps:

Step 1: providing a first substrate 2.

The first substrate 2 is a package substrate. The package substrate comprises a first transparent substrate 21, common electrodes 26 formed on the first transparent substrate 21, a first planarization layer 27 formed on the common electrodes 26, and a first alignment layer 28 formed on the first planarization layer 27.

The first transparent substrate 21 can be a glass substrate or a plastic substrate and is preferably a glass substrate in the instant embodiment. The common electrodes 26 are preferably made of indium tin oxides. The first alignment layer 28 is a horizontal alignment layer. The common electrodes 26, the first planarization layer 27, and the first alignment layer 28 are all manufactured by masking processes.

Step 2: forming a plurality of blocking walls 220 on the first substrate 2 so as to form a black matrix barrier 22 to divide the first substrate 2 into a plurality of predetermined sub-pixel areas 4, each of the sub-pixel areas 4 being surrounded by four sequentially connected ones of the blocking walls 220.

The black matrix barrier 22 is formed on the first alignment layer 28 to divide the first substrate 2 into a plurality of predetermined sub-pixel areas 4. Teach of the sub-pixel areas 4 is rectangular. In the instant embodiment, the black matrix barrier 22 is formed on the first substrate 2 through masking operation, printing, stamping, or spray-coating operation.

As shown in FIG. 5, in the instant embodiment, the plurality of blocking walls 220 all has the same height T with respect to the first substrate 2 in order to block the materials of the dye-doped liquid crystal layers 5 contained in the sub-pixel areas 4 from flowing toward each other to cause color disorderliness.

As an alternative, another preferred embodiment is shown in FIG. 6, in which the plurality of blocking walls 220' has, respectively, a first and a second heights H1, H2, where the first height H1 is greater than the second height H2. Two adjacent sub-pixel areas 4' that have dye-doped liquid crystal layers 5 comprising different types of dichroic dye have therebetween a blocking wall 220' of the first height H1, while two adjacent sub-pixel areas 4' that have dye-doped liquid crystal layers 5 comprising the same type of dichroic dye have therebetween a blocking wall 220' of the second height H2, whereby the dye-doped liquid crystal layers 5 of the sub-pixel areas 4' of different colors are completely blocked from each other, while the dye-doped liquid crystal layers 5 of the sub-pixel areas 4' of identical color are allowed to have molecules thereof flowing toward each other to improve the effect of displaying.

Step 3: applying an injection process to sequentially introduce liquid crystal materials containing a chiral dopant and dichroic dyes into the sub-pixel areas 4 so as to form dye-doped liquid crystal layers 5, the sub-pixel areas 4 respectively absorbing lights of specific wavelength ranges according to types of the dichroic dye introduced.

Since each dichroic dye has a specific absorption spectrum and the sub-pixel areas 4 that contain different types of dichroic dye exhibit different absorption spectra, by selecting and injecting different types of dichroic dyes into different sub-pixel areas, the purpose of color displaying can be achieved.

As shown in FIGS. 7 and 8, in the instant embodiment, the liquid crystal materials are a positive nematic liquid crystal material. The dichroic dyes are dissolved in the liquid crystal materials. The liquid crystal materials comprise liquid crystal molecules 52 and the dichroic dyes comprise dichroic dye molecules 54. The dichroic dye molecules 54 have a molecular structure similar to a molecular structure of the liquid crystal molecules 52. The dichroic dyes include: red dichroic dyes, green dichroic dyes, and blue dichroic dyes. The liquid crystal materials in which different dichroic dyes are dissolved are injected into the sub-pixel areas respectively to form red sub-pixels, green sub-pixels, and blue sub-pixels. The red sub-pixels absorb lights of green and blue wavelength ranges so as to allow red light to transmit therethrough; the green sub-pixels absorb lights of red and blue wavelength ranges so as to allow green light to transmit therethrough; and the blue sub-pixels absorb lights of red and green wavelength ranges so as to allow blue light to transmit therethrough.

Step 4: coating a sealant on a surface of the first substrate 2 to form a sealant frame 6.

The sealant frame 6 is formed on the same side of the sub-pixel areas 4.

Step 5: providing a second substrate 3.

As shown in FIGS. 2 and 4, wherein for easy observation, structures related to a thin-film transistor array, data lines, gate lines, and a protection layer are omitted in FIG. 2, the second substrate 3 is a thin-film transistor substrate. The thin-film transistor substrate comprises a second transparent substrate 31, a plurality of gate lines 32 formed on the second transparent substrate 31, a plurality of data lines 33 formed on the second transparent substrate 31, an array of thin-film transistors 34 formed on the second transparent substrate 31, a protection layer formed on the array of thin-film transistors 34, a plurality of pixel electrodes 36 formed on the protection layer, a second planarization layer 37 formed on the pixel electrodes 36 and the protection layer, and a second alignment layer 38 formed on the second planarization layer 37.

The second transparent substrate 31 can be a glass substrate or a plastic substrate and is preferably a glass substrate in the instant embodiment.

The thin-film transistors 34 each have a gate terminal, a source terminal, and a drain terminal. The gate terminal is electrically connected to the gate lines 32. The source terminal is electrically connected to the data lines 33. The drain terminal is electrically connected to the pixel electrodes 36. The pixel electrodes 36 are preferably made of indium tin oxides. The second alignment layer 38 is a horizontal alignment layer. The pixel electrodes 36, the second planarization layer 37, and the second alignment layer 38 are all manufactured by masking processes.

The second alignment layer 38 has an alignment direction that defines an included angle with respect to an alignment direction of the first alignment layer 28 and the included angle is greater than 0° and less than 180°. The included angle is preferably 90°. The second alignment layer 38 and the first alignment layer 28 make liquid crystal molecules 52 and dichroic dye molecules 54 contained in the dye-doped liquid crystal layers 5 show a nematic twisted arrangement in an initial condition and the twisted angle is greater than or equal to 90°, meaning when no driving voltage is applied to the first substrate 2 (the thin-film transistor substrate) and the second substrate 3 (the package substrate), the liquid crystal molecules and the dichroic dye molecules both show a twisted arrangement of 90° or more than 90° and have aligning angles in various directions, as shown in FIGS. 7 and 8.

Step 6: laminating the second substrate 3 and the first substrate 2 together in a vacuum environment in such a way that a surface of the second substrate 3 that faces the first substrate 2 is set in tight engagement with the black matrix barrier 22 so as to seal the dye-doped liquid crystal layers 5 of the sub-pixel areas 4 hermetically in the sub-pixel areas 4 respectively.

Step 7: curing the sealant frame to complete the lamination of the color liquid crystal display panel.

In this step, the laminated second substrate 3 and first substrate 2 are subject to UV curing or thermal curing in order to solidify the sealant frame.

In summary, the present invention provides a color liquid crystal display panel and a manufacturing method thereof, wherein red, green, and blue sub-pixels are formed by means of a black matrix barrier and dye-doped liquid crystal layers that contain dichroic dyes so that the manufacturing process is reduced, the structure is simple, and the cost is low. In addition, there is no need to manufacture a conventional color filter substrate and there is no need to include a conventionally used polarizer thereby simplifying the manufacturing process of a liquid crystal display panel, lowering down the manufacturing cost of the liquid crystal display panel, reducing the required backlighting brightness, and enhancing light transmittal and optic efficiency.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A color liquid crystal display panel, comprising: a first substrate, a second substrate laminated to the first substrate, a plurality of sub-pixel areas formed on the first substrate, dye-doped liquid crystal layers arranged in the sub-pixel areas, and a sealant frame arranged along a circumferential edge of the first substrate to hermetically bond the first and second substrates together, the dye-doped liquid crystal layers each comprising a liquid crystal material, a dichroic dye, and a chiral dopant, the dye-doped liquid crystal layers each absorbing a light of a specific wavelength range according to type of the dichroic dye contained therein whereby the sub-pixel areas respectively absorb lights of different wavelength ranges, the first substrate comprising a black matrix barrier formed thereon, the black matrix barrier comprising a plurality of blocking walls, each of the sub-pixel areas being surrounded by four sequentially connected ones of the blocking walls, the second substrate having a surface facing the first substrate and set in tight engagement with the black matrix barrier so as to hermetically seal the dye-doped liquid crystal layers of the sub-pixel areas in the sub-pixel areas respectively.

2. The color liquid crystal display panel as claimed in claim 1, wherein the plurality of blocking walls respectively has a first and a second heights, the first height being greater than the second height, whereby two adjacent ones of the sub-pixel areas that have dye- doped liquid crystal layers comprising different types of dichroic dye have therebetween a blocking wall of the first height, while two adjacent ones of the sub-pixel areas that have dye- doped liquid crystal layers comprising the same type of dichroic dye have therebetween a blocking wall of the second height.

3. The color liquid crystal display panel as claimed in claim 1, wherein the first substrate is a package substrate, the package substrate comprising a first transparent substrate, common electrodes formed on the first transparent substrate, a first planarization layer formed on the common electrodes, and a first alignment layer formed on the first planarization layer, the black matrix barrier being formed on the first alignment layer; and the second substrate is a thin-film transistor substrate, the thin-film transistor substrate comprising a second transparent substrate, a plurality of gate lines formed on the second transparent substrate, a plurality of data lines formed on the second transparent substrate, an array of thin-film transistors formed on the second transparent substrate, a protection layer formed on the array of thin-film transistors, a plurality of pixel electrodes formed on the protection layer, a second planarization layer formed on the pixel electrodes and the protection layer, and a second alignment layer formed on the second planarization layer.

4. The color liquid crystal display panel as claimed in claim 3, wherein the first transparent substrate and the second transparent substrate are both glass substrates, the common electrodes and the pixel electrodes being made of indium tin oxides, the first alignment layer and the second alignment layer being both horizontal alignment layers, an alignment direction of the first alignment layer defining an included angle with respect to an alignment direction of the second alignment layer, the included angle being greater than 0° and less than 180°.

5. The color liquid crystal display panel as claimed in claim 1, wherein the liquid crystal materials are a positive nematic liquid crystal material and the dichroic dyes are dissolved in the liquid crystal materials, the liquid crystal materials comprising liquid crystal molecules, the dichroic dyes comprising dichroic dye molecules, the dichroic dye molecules having selective absorptivity of visible light; when a visible light travels in a direction parallel to a major axis of the dichroic dye molecules, the dichroic dye molecules show no absorbability of the visible light and when a visible light travels in a direction perpendicular to the major axis of the dichroic dye molecules, the dichroic dye molecules show absorbability of visible light; the dichroic dyes include: red dichroic dyes, green dichroic dyes, and blue dichroic dyes, the liquid crystal materials in which different dichroic dyes are dissolved being injected into the sub-pixel areas respectively to form red sub-pixels, green sub-pixels, and blue sub-pixels, whereby the red sub- pixels absorb lights of green and blue wavelength ranges so as to allow red light to transmit therethrough; the green sub-pixels absorb lights of red and blue wavelength ranges so as to allow green light to transmit therethrough; and the blue sub-pixels absorb lights of red and green wavelength ranges so as to allow blue light to transmit therethrough.

6. A color liquid crystal display panel, comprising: a first substrate, a second substrate laminated to the first substrate, a plurality of sub-pixel areas formed on the first substrate, dye-doped liquid crystal layers arranged in the sub-pixel areas, and a sealant frame arranged along a circumferential edge of the first substrate to hermetically bond the first and second substrates together, the dye-doped liquid crystal layers each comprising a liquid crystal material, a dichroic dye, and a chiral dopant, the dye-doped liquid crystal layers each absorbing a light of a specific wavelength range according to type of the dichroic dye contained therein whereby the sub-pixel areas respectively absorb lights of different wavelength ranges, the first substrate comprising a black matrix barrier formed thereon, the black matrix barrier comprising a plurality of blocking walls, each of the sub-pixel areas being surrounded by four sequentially connected ones of the blocking walls, the second substrate having a surface facing the first substrate and set in tight engagement with the black matrix barrier so as to hermetically seal the dye-doped liquid crystal layers of the sub-pixel areas in the sub-pixel areas respectively;

wherein the plurality of blocking walls respectively has a first and a second heights, the first height being greater than the second height, whereby two adjacent ones of the sub-pixel areas that have dye-doped liquid crystal layers comprising different types of dichroic dye have therebetween a blocking wall of the first height, while two adjacent ones of the sub-pixel areas that have dye-doped liquid crystal layers comprising the same type of dichroic dye have therebetween a blocking wall of the second height.

7. The color liquid crystal display panel as claimed in claim 6, wherein the first substrate is a package substrate, the package substrate comprising a first transparent substrate, common electrodes formed on the first transparent substrate, a first planarization layer formed on the common electrodes, and a first alignment layer formed on the first planarization layer, the black matrix barrier being formed on the first alignment layer;

and the second substrate is a thin-film transistor substrate, the thin-film transistor substrate comprising a second transparent substrate, a plurality of gate lines formed on the second transparent substrate, a plurality of data lines formed on the second transparent substrate, an array of thin-film transistors formed on the second transparent substrate, a protection layer formed on the array of thin-film transistors, a plurality of pixel electrodes formed on the protection layer, a second planarization layer formed on the pixel electrodes and the protection layer, and a second alignment layer formed on the second planarization layer.

8. The color liquid crystal display panel as claimed in claim 7, wherein the first transparent substrate and the second transparent substrate are both glass substrates, the common electrodes and the pixel electrodes being made of indium tin oxides, the first alignment layer and the second alignment layer being both horizontal alignment layers, an alignment direction of the first alignment layer defining an included angle with respect to an alignment direction of the second alignment layer, the included angle being greater than 0° and less than 180°.

9. The color liquid crystal display panel as claimed in claim 6, wherein the liquid crystal materials are a positive nematic liquid crystal material and the dichroic dyes are dissolved in the liquid crystal materials, the liquid crystal materials comprising liquid crystal molecules, the dichroic dyes comprising dichroic dye molecules, the dichroic dye molecules having selective absorptivity of visible light; when a visible light travels in a direction parallel to a major axis of the dichroic dye molecules, the dichroic dye molecules show no absorbability of the visible light and when a visible light travels in a direction perpendicular to the major axis of the dichroic dye molecules, the dichroic dye molecules show absorbability of visible light; the dichroic dyes include: red dichroic dyes, green dichroic dyes, and blue dichroic dyes, the liquid crystal materials in which different dichroic dyes are dissolved being injected into the sub-pixel areas respectively to form red sub-pixels, green sub-pixels, and blue sub-pixels, whereby the red sub-pixels absorb lights of green and blue wavelength ranges so as to allow red light to transmit therethrough; the green sub-pixels absorb lights of red and blue wavelength ranges so as to allow green light to transmit therethrough; and the blue sub-pixels absorb lights of red and green wavelength ranges so as to allow blue light to transmit therethrough.

10. A manufacturing method of a color liquid crystal display panel, comprising:

(1) providing a first substrate;

(2) forming a plurality of blocking walls on the first substrate so as to form a black matrix barrier to divide the first substrate into a plurality of predetermined sub-pixel areas, each of the sub-pixel areas being surrounded by four sequentially connected ones of the blocking walls;

(3) applying an injection process to sequentially introduce liquid crystal materials containing a chiral dopant and dichroic dyes into the sub-pixel areas so as to form dye-doped liquid crystal layers, the sub-pixel areas respectively absorbing lights of specific wavelength ranges according to types of the dichroic dye introduced;

(4) coating a sealant on a surface of the first substrate to form a sealant frame;

(5) providing a second substrate;

(6) laminating the second substrate and the first substrate together in a vacuum environment in such a way that a surface of the second substrate that faces the first substrate is set in tight engagement with the black matrix barrier so as to seal the dye-doped liquid crystal layers of the sub-pixel areas hermetically in the sub-pixel areas respectively; and (7) curing the sealant frame to complete the lamination of the color liquid crystal display panel.

11. The manufacturing method of the color liquid crystal display panel as claimed in claim 10, wherein the plurality of blocking walls respectively has a first and a second heights, the first height being greater than the second height, whereby two adjacent ones of the sub-pixel areas that have dye-doped liquid crystal layers comprising different types of dichroic dye have therebetween a blocking wall of the first height, while two adjacent ones of the sub- pixel areas that have dye-doped liquid crystal layers comprising the same type of dichroic dye have therebetween a blocking wall of the second height;

in step (7), the laminated second substrate and first substrate being subjected to UV curing or thermal curing to solidify the sealant frame.

12. The manufacturing method of the color liquid crystal display panel as claimed in claim 10, wherein the first substrate is a package substrate, the package substrate comprising a first transparent substrate, common electrodes formed on the first transparent substrate, a first planarization layer formed on the common electrodes, and a first alignment layer formed on the first planarization layer, the black matrix barrier being formed on the first alignment layer; and the second substrate is a thin-film transistor substrate, the thin-film transistor substrate comprising a second transparent substrate, a plurality of gate lines formed on the second transparent substrate, a plurality of data lines formed on the second transparent substrate, an array of thin-film transistors formed on the second transparent substrate, a protection layer formed on the array of thin-film transistors, a plurality of pixel electrodes formed on the protection layer, a second planarization layer formed on the pixel electrodes and the protection layer, and a second alignment layer formed on the second planarization layer.

13. The manufacturing method of the color liquid crystal display panel as claimed in claim 12, wherein the first transparent substrate and the second transparent substrate are both glass substrates, the common electrodes and the pixel electrodes being made of indium tin oxides, the first alignment layer and the second alignment layer being both horizontal alignment layers, an alignment direction of the first alignment layer defining an included angle with respect to an alignment direction of the second alignment layer, the included angle being greater than 0° and less than 180°.

14. The manufacturing method of the color liquid crystal display panel as claimed in claim 10, wherein the liquid crystal materials are a positive nematic liquid crystal material and the dichroic dyes are dissolved in the liquid crystal materials, the liquid crystal materials comprising liquid crystal molecules, the dichroic dyes comprising dichroic dye molecules, the dichroic dye molecules having selective absorptivity of visible light; when a visible light travels in a direction parallel to a major axis of the dichroic dye molecules, the dichroic dye molecules show no absorbability of the visible light and when a visible light travels in a direction perpendicular to the major axis of the dichroic dye molecules, the dichroic dye molecules show absorbability of visible light; the dichroic dyes include: red dichroic dyes, green dichroic dyes, and blue dichroic dyes, the liquid crystal materials in which different dichroic dyes are dissolved being injected into the sub-pixel areas respectively to form red sub-pixels, green sub-pixels, and blue sub-pixels, whereby the red sub-pixels absorb lights of green and blue wavelength ranges so as to allow red light to transmit therethrough; the green sub-pixels absorb lights of red and blue wavelength ranges so as to allow green light to transmit therethrough; and the blue sub-pixels absorb lights of red and green wavelength ranges so as to allow blue light to transmit therethrough.

* * * * *